Feb. 13, 1968  C. G. ELLWANGER  3,368,455
GEAR CUTTING MACHINE WITH STOCK-DIVIDER
Filed Dec. 10, 1965  5 Sheets-Sheet 2

Feb. 13, 1968   C. G. ELLWANGER   3,368,455
GEAR CUTTING MACHINE WITH STOCK-DIVIDER
Filed Dec. 10, 1965   5 Sheets-Sheet 4

United States Patent Office 3,368,455
Patented Feb. 13, 1968

3,368,455
GEAR CUTTING MACHINE WITH
STOCK-DIVIDER
Charles G. Ellwanger, Rochester, N.Y., assignor to The Gleason Works, Rochester, N.Y., a corporation of New York
Filed Dec. 10, 1965, Ser. No. 512,870
9 Claims. (Cl. 90—1)

The present invention relates to a gear machine having means for stock-dividing workpieces so as to enable tooth surfaces to be cut on them in accurately predetermined relation to previously cut tooth surfaces.

Stock dividers are conventionally provided for the purpose of angularly positioning work gears on cutting machines by reference to surfaces cut on the gears in a preceding operation, for example to so angularly position the gears that in finish cutting them equal amounts of stock will be removed from the opposite sides of teeth or tooth slots that have been rough cut in a preceding operation. Usually such stock division need be made with only the precision required to assure cutting over the entireties of both tooth sides in the finishing operation. However much greater precision is sometimes desired, for example in cases where two or more sets of gear teeth must be cut in an exact and predetermined angular relation on the same gear body, as in gears for a divided power train where the load is to be equally shared by both branches. The object of the present invention is a mechanism capable of stock division to such great accuracy.

A gear cutting machine according to the invention comprises a spindle having a work support with a plane work seating face perpendicular to the spindle rotation axis and radially movable work-gripping portions, a stock-divider support, one of said supports having a centering formation located on said axis and engageable with a centering formation on a workpiece, a plunger yieldably movable in the stock-divider support along said axis to maintain said centering formations engaged and the workpiece seated upon said seating face, and jaws movable on the stock divider support to close substantially radially in approximately opposed tooth slots of the workpiece to thereby rotate the workpiece on said seating face and about said axis into a predetermined angular position.

Preferably the first-mentioned centering formation is slidable axially in the work support, and means are provided for pressing it against the workpiece in a direction to urge the latter away from the seating face; means are provided for pressing the plunger against the workpiece in the opposite direction and with greater force than that exerted by the centering formation, to thereby hold the workpiece seated upon said seating face when said supports are in stock-dividing position; and the supports are relatively movable in a fixed path between an idle position, in which they are sufficiently separated to enable a workpiece to be placed in or removed from the workholder, and said stock-dividing position wherein the plunger and the centering formations are axially aligned.

It has been found that the accuracy of the stock-dividing operation is greatly enhanced by repetition, and hence the machine in its preferred form is provided with a means which act, upon relative movement of the supports into stock-dividing position, to close the jaws, then open them, then reclose them, and then, after the workpiece is chucked, again open the jaws before return of the supports to their idle relationship.

A preferred embodiment of the invention is shown in the accompanying drawings, wherein.

Figure 2:
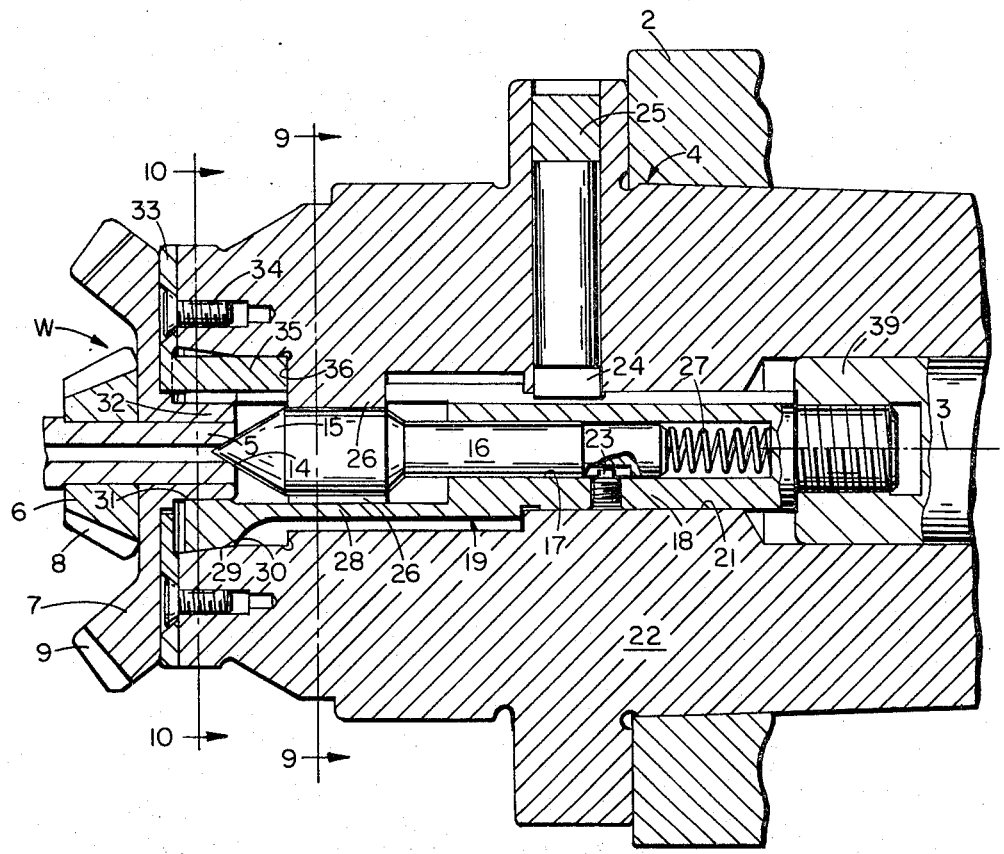
FIG. 2 is an axial section through the work-supporting chuck.
Figure 3:
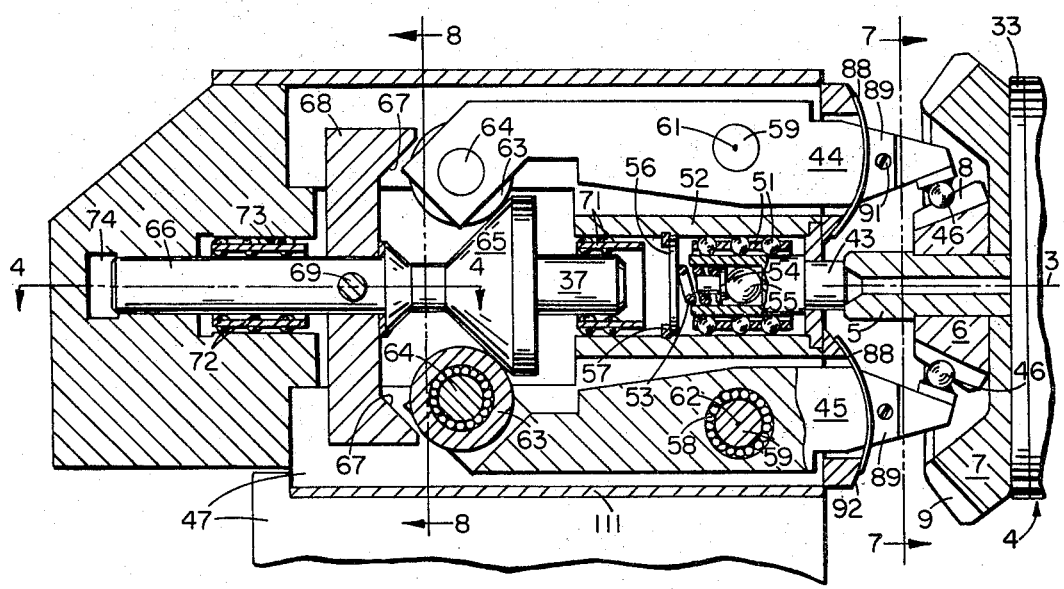
FIG. 3 is a sectional view of the stock-dividing mechanism in planes 3—3 of FIG. 7, these planes containing the axis of the chuck shown in FIG. 2.
Figure 4:
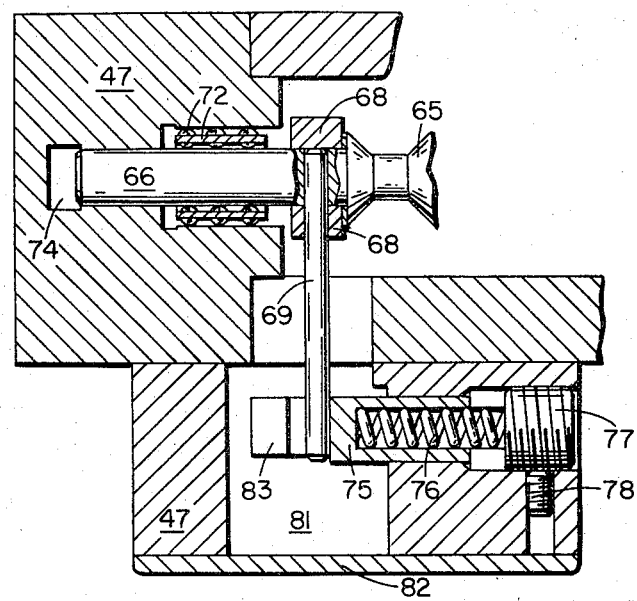
FIG. 4 is a detail section in plane 4—4 of FIG. 3.
Figure 5:
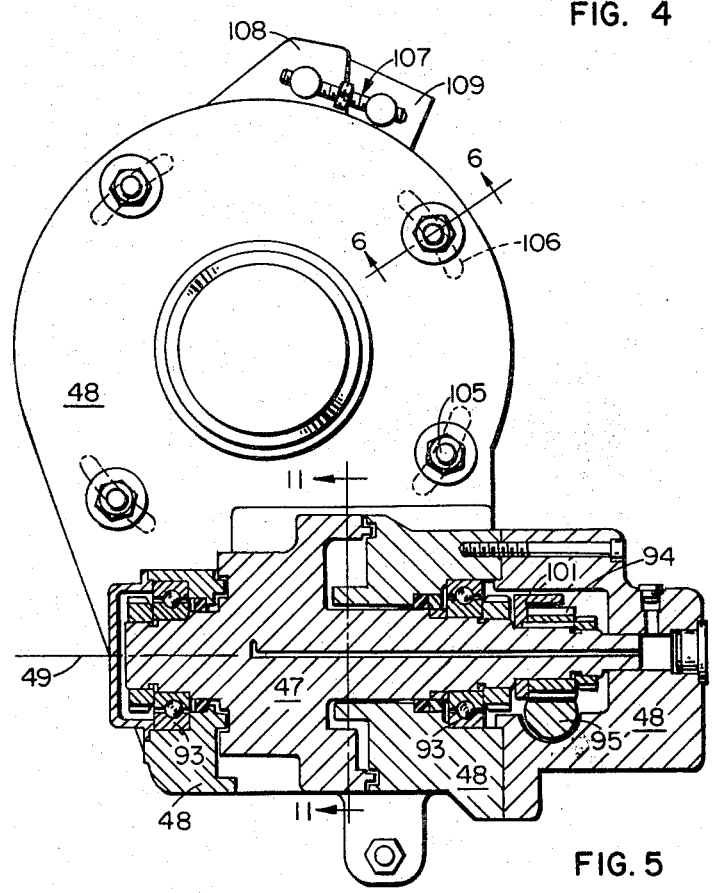
FIG. 5 is a section perpendicular to the chuck axis, in planes 5—5 of FIG. 1.
Figure 7:
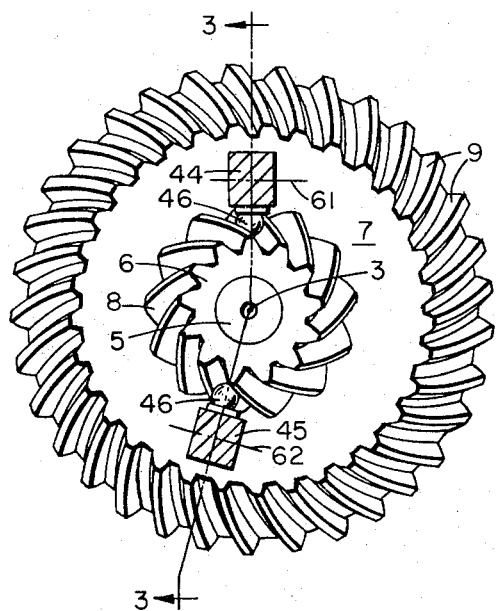
Figure 11:
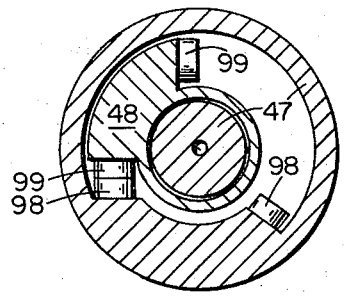

FIGS. 7 to 10 are cross-sectional views respectively in planes 7—7 and 8—8 of FIG. 3, and planes 9—9 and 10—10 of FIG. 2;

FIG. 11 is a cross-sectional view in plane 11—11 of FIG. 5; and

Figure 12:
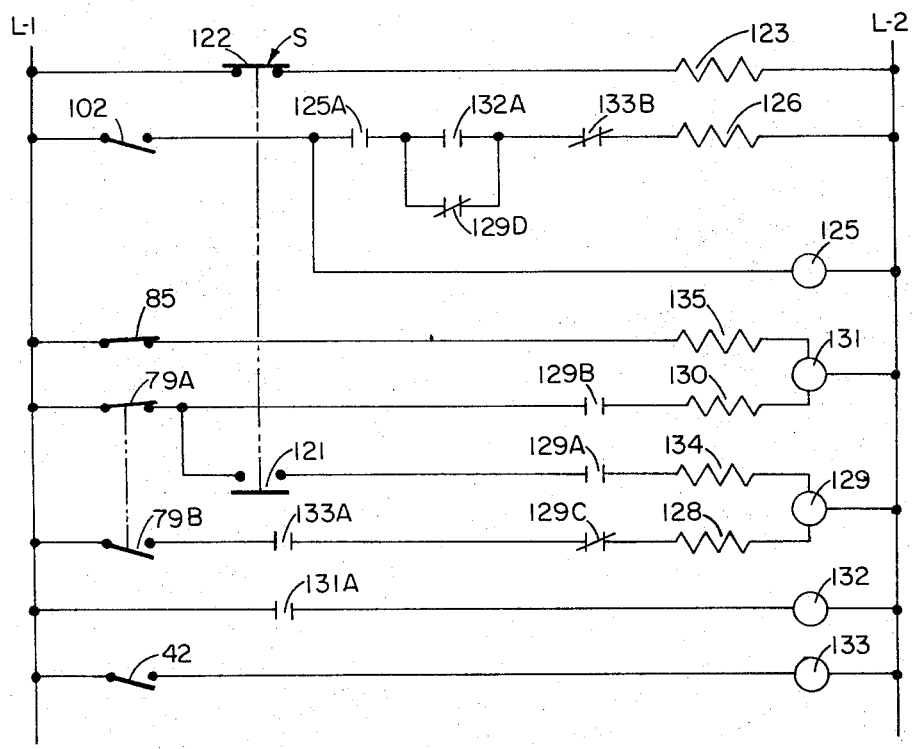

FIG. 12 is a wiring diagram of the control system for the stock-dividing mechanism.

Figure 1:
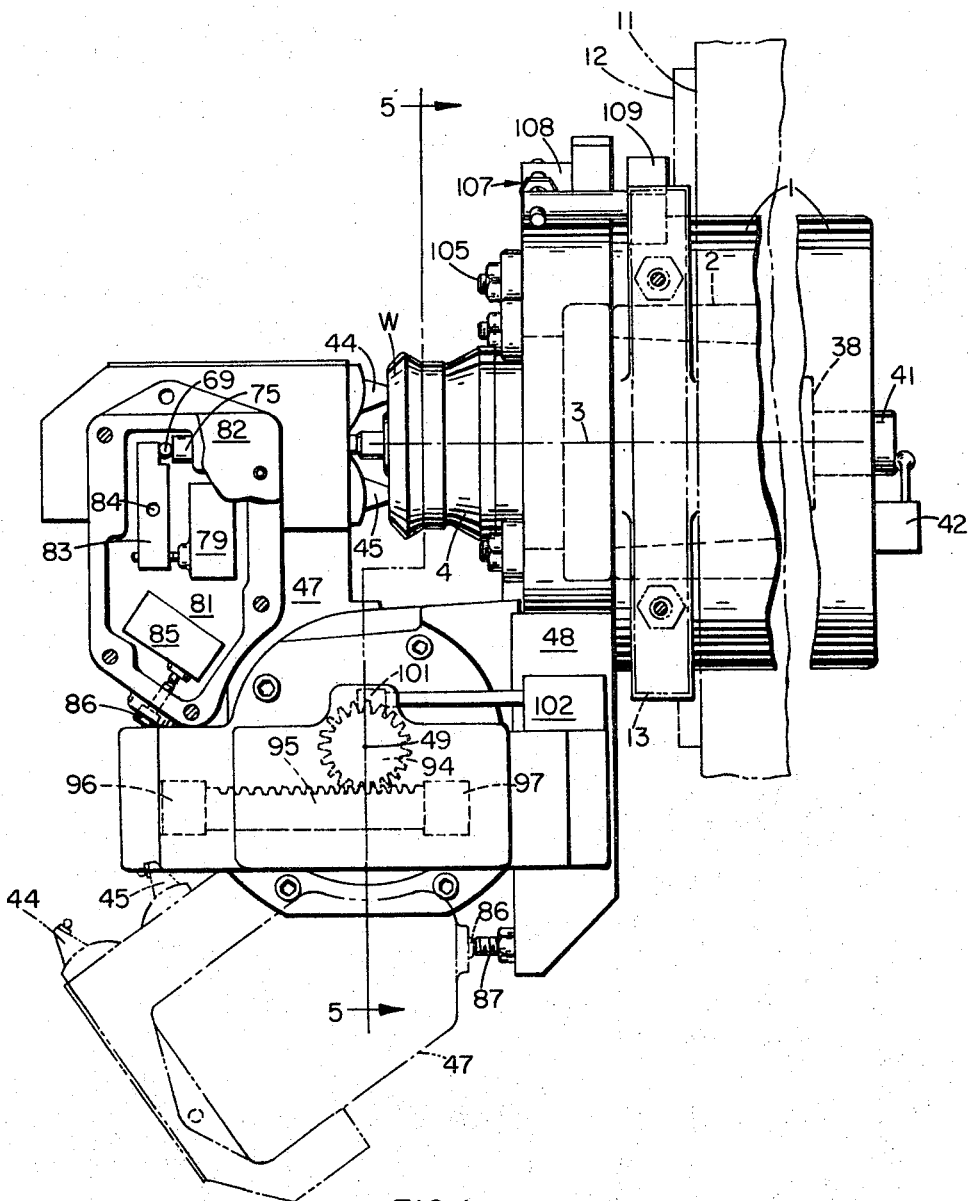
FIG. 1 is a side elevation of the work supporting and stock-dividing mechanisms, and the part of the machine which supports them.

The machine is of the general kind disclosed in Patent 2,667,818, granted Feb. 2, 1954, to A. L. Stewart et al., and as shown in FIG. 1 includes a housing 1 in which a work spindle 2 is rotatable about horizontal axis 3. To the spindle is secured a work support in the form of a chuck 4 for the workpiece W. The tooth cutting tool and the parts of the machine for producing the cutting action between the tool and workpiece are not a part of the invention, and hence are not illustrated. There is shown in broken lines a fragment of a column 11 of the machine upon which the spindle housing 1 is mounted. The column has a guide 12 along which the housing is vertically adjustable and to which it is secured by a gib 13.

Referring to FIG. 2, the workpiece W in this instance is a composite bevel gear consisting of a stem 5, a spiral bevel pinion 6 and a spiral bevel gear 7. After teeth 8 of the pinion and gear have been cut the pinion and gear are brazed or otherwise secured to each other and to the stem before the composite workpiece is mounted on the present machine for cutting of teeth 9 in gear 7 in a predetermined angular relation about the gear axis to the teeth 8.

Stem 5 of the workpiece has a conical counterbore 14 which is engaged by the tapered end 15 of an ejecting pin 16, for centering the workpiece in the chuck 4. The workpiece is further located by seating of the plane back face of gear 7 against the front face of the chuck. The pin 16 is slidable in an axial bore 17 in the stem 18 of a collet 19 which is axially slidable in bore 21 in body 22 of the chuck. A key 23 slidable in a longitudinal keyway in pin 16 holds the pin against rotation in the collet 19. Similarly, a key 24, retained in body 22 by a cap 25, engages in a longitudinal keyway in the collet 19 to hold the latter against rotation in the chuck. Pin 16 is further centered and guided for its axial motion by radially inwardly extending bearing portions 26 of chuck body 22. See also FIG. 9. A spring 27 in bore 17 of the collet urges the pin forwardly, in a direction to eject the workpiece. However the stroke of the pin is so limited by key 23 that the back hub 32 of the workpiece remains in the chuck.

The collet 19 is split from the front thereof to stem 18 to provide several, in this instance three, radially flexible fingers 28 which have at their forward end an external conical surface 29 slidable in a complementary internal coaxial surface 30 in the chuck body 22. Fingers 28 also have internal cylindrical surfaces 31 for engaging the outer cylindrical surface of hub 32. For seating the back face of gear 7 of the workpiece a face plate 33 is secured by screws 34 to the front of the chuck body. The central portion of the plate which overlies the central bore in the front of the chuck body is reinforced against rearward deflection by having rearwardly projecting prongs 35 (see also FIG. 10) whose ends abut the front faces 36 of bearing portions 26 of the body, as shown in FIG. 2.

The collet is moved axially by an hydraulic actuator mounted on the back of spindle 2, FIG. 1, the piston 38 of the actuator being connected by a rod 39, FIG. 2, to the collet stem 18. Upon rearward motion of the collet (to the right) the split end of the collet is contracted radially by co-action of conical surfaces 29, 30, causing surface 31 to grip the hub of the work-piece and clamping the back face of fear 7 of the workpiece to face plate 33. Upon operation of the piston 38 to the left to move the collet forwardly, the conical surfaces 29, 30 are separated, allowing the split end of the collet to expand slightly to its normal unflexed condition, thereby releasing the workpiece for forward displacement by action of spring 27. A rearward extension 41 is provided on piston 38 to close a limit switch 42, that is mounted on the actuator, when the piston has completed its stroke to the right, to signal that the chucking action has been completed.

The stock-dividing mechanism, FIG. 3, comprises a plunger 43 bearing upon the front face of workpiece stem 5, to press the back face of workpiece gear 7 against face plate 33, and a pair of jaws 44 and 45 in the form of levers having at one end ball tips 46 (see also FIG. 7) for engaging in approximately opposed tooth slots of workpiece pinion 6. In a case where the pinion 6 has an even number of teeth, the tips 46 would preferably engage in exactly opposed tooth slots, but in the illustrated case, where the number of teeth is odd, the engaged slots can only be in approximate diametral opposition.

Figure 8:
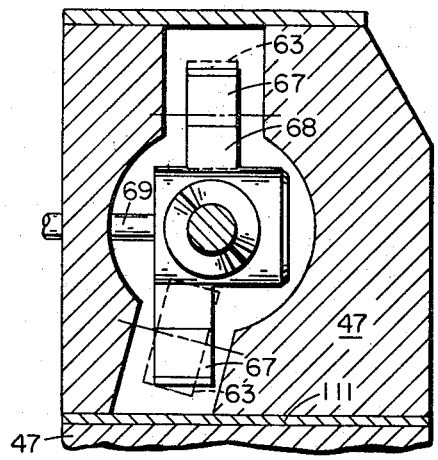

The plunger 43 and jaws 44, 45 are carried by a multi-part support 47, FIGS. 1, 3 and 8, which is pivoted to a bracket 48 about an axis 49 that is in perpendicular and offset relation to axis 3, to enable the support to be swung between its stock-dividing position shown in full lines in FIG. 1, and its idle position, there shown in broken lines, well clear of the workpiece, so as not to interfere with the operation of cutting the teeth 9. Bracket 48 is supported by housing 1, and is adjustable thereon about axis 3 to bring the ball tips 46 exactly into the desired positions around that axis.

As shown in FIG. 3, the plunger 43 is supported for axial motion in a ball-sleeve bearing 51 within a sleeve 52 secured in support 47. A spring 53 acts against the plunger through a button 54 and ball 55, the latter being disposed between plane faces of the button and plunger which are perpendicular to axis 3, to avoid non-axial pressure against the plunger. Spring 53 reacts against a disc 56 retained in the sleeve by a snap ring 57. This spring must exert a greater force than chuck spring 27, FIGS. 2, so that the workpiece is held against face plate 33. Jaws 44, 45 are mounted on needle bearings 58 on pins 59 secured to support 47. As shown by their projections into the plane of FIG. 7, the axes of these pins, respectively 61 and 62, are so positioned that the ball tips 46 will move in planes radial of axis 3 as the jaws open and close. Rollers 63 are mounted, also on needle bearings, on pins 64 secured to the ends of the jaws levers opposite to ball tips 46. These pins 64 are parallel to the related axes 61 and 62. Rollers 63 are confined in guide slots of an actuator that an inclined at about a 45° angle to axis 3 (when support 47 is in stock-dividing position). The side walls of these guide slots consist of conical surface 65 of an actuator plunger 66 and inclined faces 67 of a member 68 that is secured to the plunger by a cross pin 69, FIGS. 1, 3, 4 and 8.

Plunger 66, FIG. 3, is guidingly supported for reciprocation along axis 3 by ball sleeve bearings 71 and 72 respectively within sleeve 52 and bore 73 of support 47. The jaws are opened by application of hydraulic pressure against the end of plunger 66 in chamber 74 in the support, which moves the plunger to the right, causing surfaces 67 to act against rollers 63 and thereby open the jaws, moving ball tips 46 radially outwards to positions clear of pinion teeth 8. The ball tips are moved radially inwards, to engage the pinion teeth, and rotate the pinion into a definite position about axis 3, by movement of the plunger 66 to the left, during which conical surface 65 engages the rollers 63. This motion is effected by a plunger 75, FIG. 4, backed by spring 76, acting against cross pin 69, when pressure in chamber 74 is released. The pressure exerted by spring 76 is adjustable by means of a screw 77 which is secured by a set screw 78.

Completion of the motion of plunger 66 to the left results in actuation of a limit switch 79, FIG. 1, mounted in a chamber 81 in support 47 closed by a cover 82. Actuation of the limit switch is by a lever 83 which is fulcrumed to the support at 84 and is abutted by cross pin 69 at the end of the latter's travel to the left. Chamber 81 also contains a limit switch 85 that is closed when support 47 reaches its idle position shown in broken lines. Such closure is effected by abutment of a spring-backed plunger 86, carried by the support, with a stop screw 87 on bracket 48 and with the actuating stem of the switch 85.

Arcuate guards 88, FIG. 3, whose axes of curvature coincide with axes 61 and 62, have flanges 89 secured to jaws 44 and 45 by screws 91. These guards cooperate with complementary surfaces 92 on support 47 to exclude dirt from the interior of the support.

Referring to FIG. 5, support 47 is mounted on anti-friction bearings 93 in bracket 48 for its pivotal motion about axis 49. For effecting this motion a pinion 94 (see also FIG. 1) on the support meshes with a rack 95 which connects opposed pistons 96 and 97 that are reciprocated in cylinders in the bracket by hydraulic pressure. The pivotal motion of the support 47 between its idle and stock dividing positions is limited by the abutment of stop buttons 98, FIG. 11, carried by the support, with stop buttons 99 on the bracket 48. An arm 101, FIGS. 1 and 5 rotatable with pinion 94, acts to close a limit switch 102 as the support 47 approaches its stock dividing position.

Figure 6:
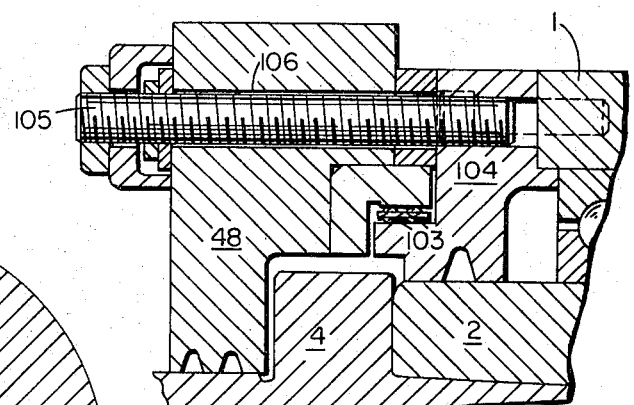
FIG. 6 is a detail section in a plane 6—6 of FIG. 5, which contains the chuck axis.
Figure 9:
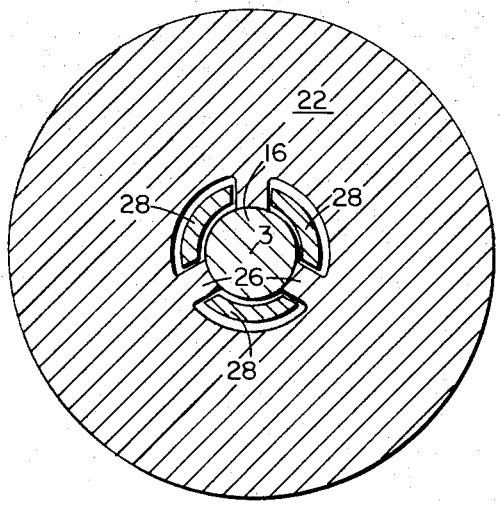
Figure 10:
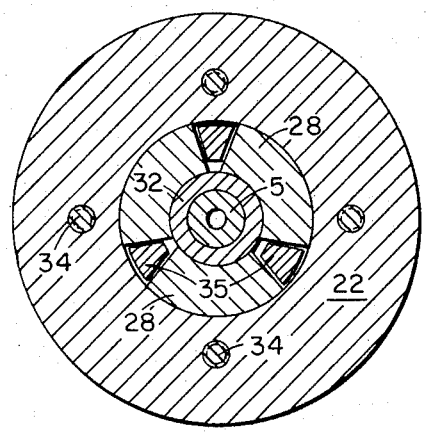

Bracket 48 is supported by a ball sleeve bearing 103, FIG. 6, for limited rotational adjustment about axis 3 on a coaxial ring 104 that is rigidly secured to the front of housing 1. The bracket secured to the ring by screws 105 which extend through arcuate slots 106 in the bracket into the ring. Upon loosening of the nuts on these screws, the rotational adjustment may be made by means of a turnbuckle 107 which extends between lugs 108, 109 respectively on the ring and bracket. This adjustment serves to adjust the ball tips 46 angularly about axis 3. For adjusting the stock-dividing mechanism radially of axis 49, in aligning plunger 43 with axis 3, a shim 111, FIG. 3, is provided between the radially outer and inner sections of support 47. Adjustment of the angular alignment of the plunger 43 with axis 3 in a vertical plane may be effected by trimming the height of the button 98 at the left in FIG. 11.

The electrical circuit diagram shown in FIG. 12 will now be described in connection with the operating sequence of the stock dividing mechanism. With the stock divider support 47 in idle position, and spindle 2 locked in a predetermined angular position in its housing (by known means, not shown), a workpiece W is placed in chuck 4 and a switch S is operated to open its contacts 121 and close its contacts 122, thereby closing a circuit across leads L–1 and L–2 through valve-operating solenoid 123. The related valve applies hydraulic pressure to piston 97, FIG. 1, and places the cylinder chamber of piston 96 on exhaust, thereby causing support 47 to be swung to stock-dividing position wherein spring-backed plunger 43, FIG. 3, holds the workpiece against chuck face plate 33. This motion of support 47 opens limit switch 85, and closes limit switch 102, the latter energizing a time relay 125 which after a delay, preferably of about three seconds, closes its contacts 125A and thereby energizes a valve-operating solenoid 126. The related valve releases hydraulic pressure from chamber 74, FIG. 4, causing spring 76 to close the stock-divider jaws 44, 45, so that their ball tips 46 act against the sides of widely spaced teeth 8 to rotate the workpieces toward the angular position thereof in the chuck which has been predetermined by the several adjustments of the stock-dividing mechanism heretofore described.

Closing of the jaws operates limit switch 79, opening its contacts 79A and closing its contacts 79B, the latter energizing latch solenoid 128 of latch relay 129, whose contacts 129A and 129B thereupon close and contacts 129C and 129D open. The opening of contacts 129D de-energizes valve solenoid 126 with the result that pressure is applied to chamber 74, FIG. 4, and plunger 66 opens the stock-divider jaws. This opens contacts 79B and closes contacts 79A, the latter energizing latch coil 130 of latch relay 131 whose contacts 131A close to activate time relay 132. After a delay, preferably of about two seconds, contacts 132A of this relay close a circuit through valve solenoid 126, again closing the stock-dividing jaws. This operates limit switch 79, opening its contacts 79A and closing contacts 79B, without immediate effect.

The workpiece is now chucked by reversal of pressure to piston 38, FIG. 1, this closing limit switch 42 and thereby energizing relay 133, whose contacts 133A and 133B then open with the result that valve solenoid 126 is de-energized, so that the stock-dividing jaws open. Limit switch 79 is thereby operated to open contacts 79B and close 79A. Now upon operation of switch S to close contacts 121 and open contacts 122, relay 129 is unlatched by the circuit through its solenoid 134; and solenoid 123 is de-energized to apply hydraulic pressure against piston 96, and place the cylinder chamber of piston 97 on exhaust, to thereby cause return of support 47 to its idle position wherein it opens limit switch 102 and also closes the limit switch 85, the latter energizing the unlatch coil 135 of relay 131, so that contacts 131A open. When, after the teeth 9 have been cut in the workpiece, the latter is dechucked with the result that limit switch 42 is opened. This completes the stock-dividing cycle by restoring the electrical system to the condition in which the cycle started.

In the event the workpieces are manually loaded and unloaded the switch S may be manually operated. However when the machine is provided with an automatic work handling mechanism it is preferable that the contacts 121, 122, be contacts of a relay coordinated with the electrical control system of that mechanism.

Having now described the preferred embodiment of my invention, what I claim is:

1. A gear cutting machine or the like comprising a spindle having a work support with a plane work seating face perpendicular to the spindle rotation axis and radially movable work-gripping portions, a stock-divider support, one of said supports having a centering formation located on said axis and engageable with a centering formation on a workpiece, a plunger yieldably movable in the stock-divider support along said axis to maintain said centering formations engaged and the workpiece seated upon said seating face, and jaws movable on the stock divider support to close substantially radially in approximately opposed tooth slots of the workpiece to thereby rotate the workpiece on said seating face about said axis into a predetermined angular position.

2. A machine according to claim 1 in which the first-mentioned centering formation is on a member which is slidable axially in the work support and means are provided for pressing said member against the workpiece in an axial direction to urge the latter away from said seating face.

3. A machine according to claim 2 in which means are provided for pressing said plunger against the workpiece in the opposite axial direction and with greater force than that exerted by the centering formation, to thereby hold the workpiece seated against said seating face when said supports are in stock-dividing position.

4. A machine according to claim 3 in which said supports are relatively movable in a fixed path between an idle position, in which they are relatively separated sufficiently to enable a workpiece to be placed in or removed from the workholder, and said stock-dividing position wherein said plunger and said centering formations are axially aligned and relatively adjacent.

5. A machine according to claim 4 having means which act, upon relative movement of the supports into stock-dividing position, to close said jaws, then open them, then reclose them, and then reopen them.

6. A machine according to claim 4 in which said spindle is rotatable in a spindle housing, the stock-divider support is pivotally connected to said housing, for the relative motion in said fixed path, about an axis that is substantially perpendicular to and offset from the spindle axis, and there is a power-operated actuator for moving the stock-divider support relative to said housing back and forth through said path between said idle and stock-dividing positions.

7. A machine according to claim 6 in which the pivotal connection of the stock-divider support is to a bracket which is secured to the spindle housing for angular adjustment thereon about the spindle axis.

8. A machine according to claim 1 in which said jaws comprise a pair of levers pivoted to the stock-divider support about axes which are both perpendicular to and are equally but approximately oppositely offset from the axis of said plunger, and a common actuator for said levers movable back and forth in the support along said axis.

9. A machine according to claim 8 in which said actuator has thereon guide slots which are inclined at an acute angle to said axis, each lever carrying a roller riding in one of said slots.

References Cited

UNITED STATES PATENTS

| | | | |
|---|---|---|---|
| 2,782,689 | 2/1957 | Carlsen et al. | 90—1 |
| 3,108,412 | 10/1963 | Benjamin et al. | 279—1 |
| 3,169,446 | 2/1965 | Anderson et al. | 90—1 |

LEONIDAS VLACHOS, *Primary Examiner.*